Feb. 9, 1943. W. A. POOL 2,310,807
TIRE CHAIN
Filed June 17, 1941 2 Sheets-Sheet 1
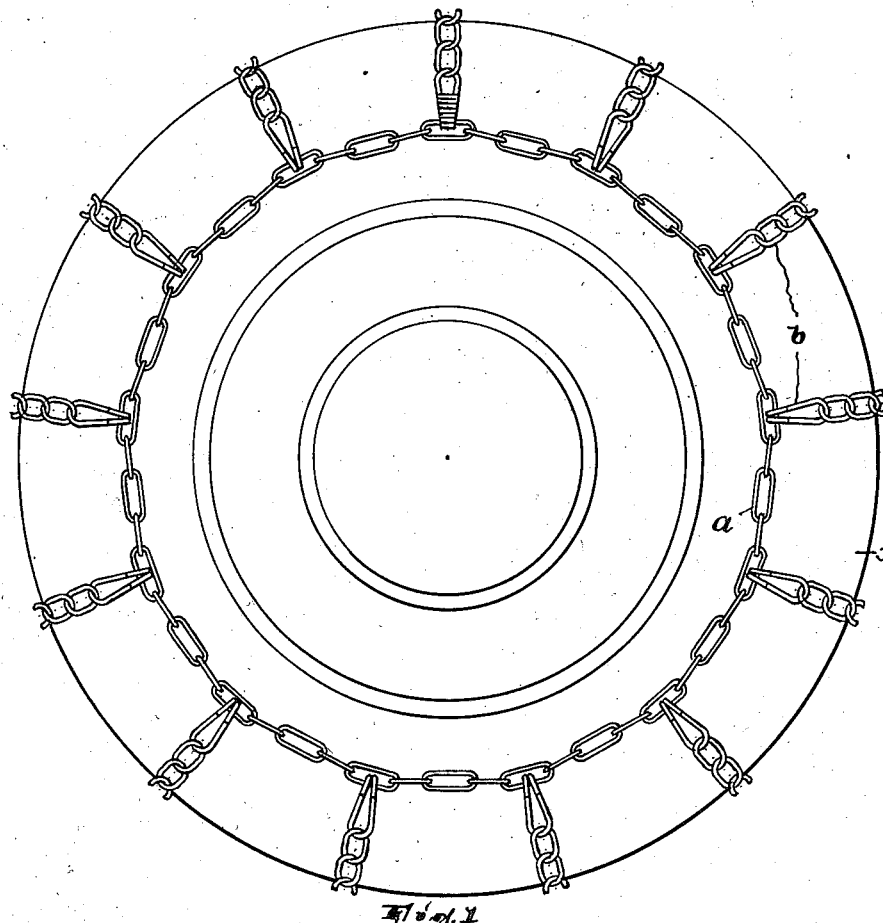
Fig. 1.
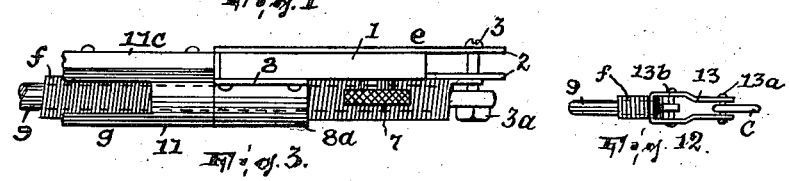
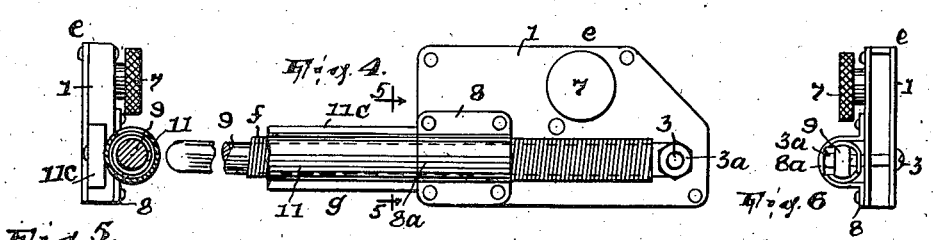
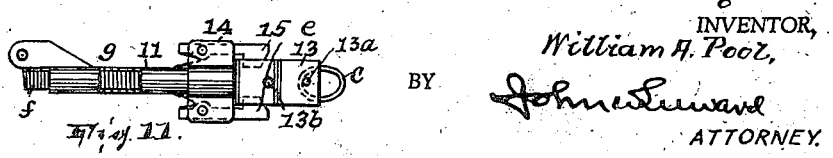
INVENTOR,
William A. Pool,
BY John E. Seward
ATTORNEY.

Feb. 9, 1943.　　　　W. A. POOL　　　　2,310,807
TIRE CHAIN
Filed June 17, 1941　　　　2 Sheets-Sheet 2

INVENTOR,
William H. Pool,
BY John Steward
ATTORNEY.

Patented Feb. 9, 1943

2,310,807

UNITED STATES PATENT OFFICE 2,310,807

TIRE CHAIN

William A. Pool, Ridgefield Park, N. J.

Application June 17, 1941, Serial No. 398,363

6 Claims. (Cl. 152—242)

The invention relates to anti-skid devices for tires. In the usual form such a device comprises inner and outer side-chains of less circumference than the tire and cross-chains connecting them at intervals and forming the traction elements. Each side-chain is capable of being parted, containing in its otherwise endless extent a releasable coupling for this purpose. It is well known to be extremely difficult to apply such a device to the tire even if the wheel is jacked up so that the tire is clear of the ground.

According to this invention an anti-skid device is provided which may be readily applied to the tire while the latter rests on the ground. To this end the inner endless flexible system corresponding to the inner side-chain of the usual device is characterized by presence in a segment thereof of elastic extensible means, whereby the circumference of the system may be made greater than that of the tire. Having draped the device over the tire (resting on the ground) and in that operation extended said system as far as possible, or so as to leave only the portion thereof adjacent the ground at the outside of the tire, the vehicle is moved so that said system in its effort to contract will assume a state in which it is wholly at the inside, and contracted to a circumference less than that of the tire. So much is not broadly new in this art. But according to this invention, when the contraction takes place the system becomes automatically non-extensible so that thereupon it cooperates with the outer endless system, also non-extensible, properly to support the cross-chains or equivalent traction elements in their tractive effort.

In the drawings,

Fig. 1 is an outside view of a tired wheel with the device shown applied thereto and in its ultimate state;

Fig. 2 is an inside view of the tire resting on the ground and with said device (which here appears schematically, certain details appearing in the other figures) applied thereto in condition to assume its ultimate state when the wheel undergoes rolling, excepting that the portion of the inside system designated c is shown diagrammatically as of a length appreciably less than it actually has and with the corresponding six cross-chains omitted;

Figs. 3 and 4 are a fragmentary plan and side elevation, respectively, of one of the terminal members e, elastic extensible members f and a linkage g;

Fig. 5 is a section on line 5—5, Fig. 4;

Fig. 6 is a right-side elevation of what is shown in Fig. 4;

Figs. 11 and 12 are fragmentary views in side elevation and plan, respectively, of a modified form of the interlocking means.

Figure 2:
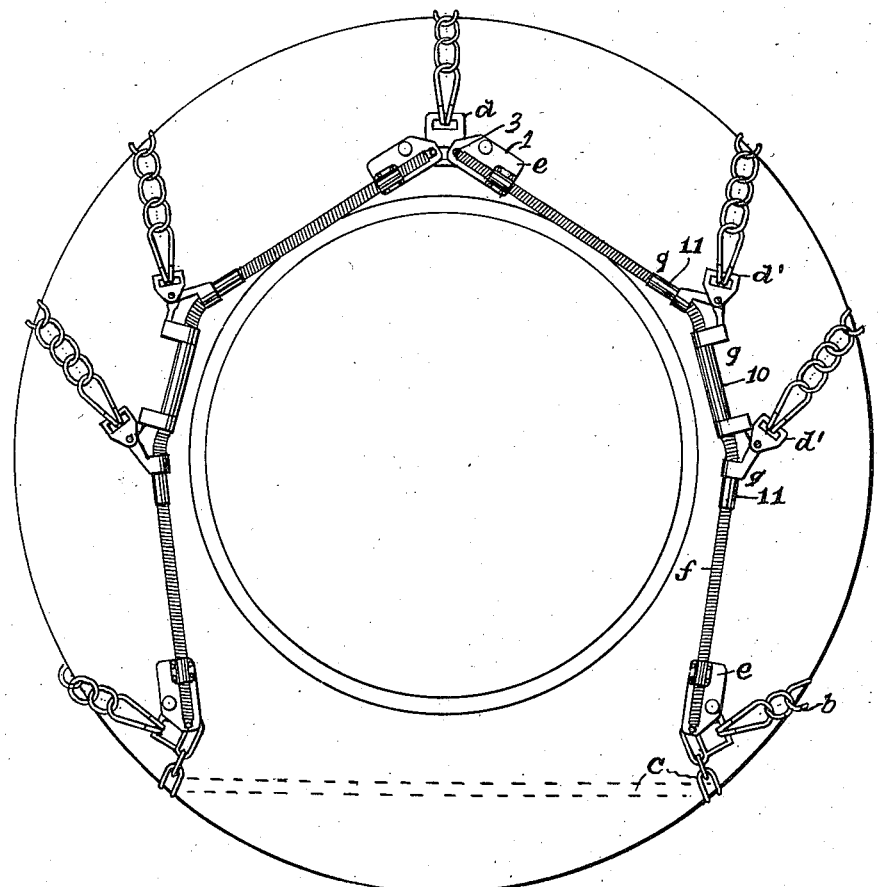

Let $a$ be the outer non-extensible endless system. It is here a side-chain but in defining it as endless I do not mean to exclude its being adapted, as by presence of releasable coupling means, to be parted. $b$ denotes the traction elements, here the usual cross-chains, being connected at intervals to said system and also to the inner endless system as will appear.

The latter system in the example shown comprises, with a flexible non-extensible segment $c$ (here a chain partly hidden by the tire $x$ in Fig. 2), a coupling $d$ opposite segment $c$, and elastic extensible segments respectively connecting the ends of segment $c$ with coupling $d$ and each comprising parts as follows, designated by general reference characters in Fig. 2; terminal members $e$, one of which is pivotally connected to an end of segment $c$ and the other similarly connected to coupling $d$, and an elastic extensible element $f$ connecting the two terminal members. Associated with this latter segment and adapted to hold said members against displacement apart, so that such system when in ultimate or operative state on the tire is non-extensible, is a flexible linkage generally designated $g$ in Fig. 2, and to this couplings $d'$ are pivoted. The traction elements $b$ are connected to the couplings $d$ and $d'$. Considering, now, the parts $e$, $f$ and $g$ of each elastic extensible segment in detail:

*Terminal members $e$.*—These are substantial duplicates of each other. A flat case 1 has a projecting fork 2 traversed by a screw 3 having a nut $3a$ and forming the pivot for the coupling $d$ or the end link of segment $c$, as the case may be. In the case is pivoted between its ends a pawl 4 whose hook-end is adjacent the end of the case having an opening $1a$ to admit a hook-shaped dagger or hook ($11c$, to be referred to) and between whose other end and a wall of the case is a spring 5 active to depress the hook-end of the pawl. If the mentioned dagger or hook stands entered in the case as shown in Figs.

7 and 8, on turning the pawl so as to free the dagger (Fig. 8) the pawl is retained in its new position, to wit, by an elastic lever-like detent 6 pivoted in the case and one end of which is to bear on the dagger 11c while its other end affords an abutment to be engaged by an elastic catch 4a of the pawl. A rotary button or cam 7 is journaled in the case to afford the means for manually turning the pawl from the Fig. 7 to the Fig. 8 position. Assume the dagger stands caught by the pawl: if it is to be released the operator merely has to turn the button to cause it to turn the pawl to releasing position; there the pawl is automatically retained so long as the dagger is not withdrawn, but if the dagger is withdrawn first the detent and then the pawl are freed, each resuming its normal position, i. e., so that the dagger, when next entered to the case, will be caught by the pawl. Affixed to the outer side of the case is a plate 8 having an arched portion 8a forming a bushing in line with screw 3 and pivoted to the screw and projecting through and beyond the bushing a short distance is a stem 9, the purpose of which parts will appear later.

*Elastic extensible element f.*—This is a helical metal spring having its ends connected to screws 3 and penetrated by the stems 9 and penetrating and so confined to the cases by the bushings 8 of the two terminal members e.

*Linkage g.*—There are five parts. Part 10 is generally tubular and through it spring f extends, it having at each end lateral extensions 10a whose terminals 10b are so bent as to project crosswise of said part and into superposed relation to each other. Part 10 exists between two other tubular parts 11 (counterparts of each other) through which said spring also extends. Each such part 11 at its end adjacent to part 10 has lateral extensions 11a formed with terminals 11b projecting toward part 10, and it has riveted to its side and projecting beyond its other end the mentioned dagger 11c. Between part 10 and each part 11 is a link 12; the link is pivoted to the terminals 10b and 11b on crossing axes 13 and 14 so that a universal joint exists between part 10 and each part 11. It is to the pivots 14 that the couplings d' are pivoted. The universal joints thus formed permit flexing of the linkage (and thus avoid distortion of its parts) in handling the device when detached from or in attaching it to or detaching it from the tire.

Figure 7:
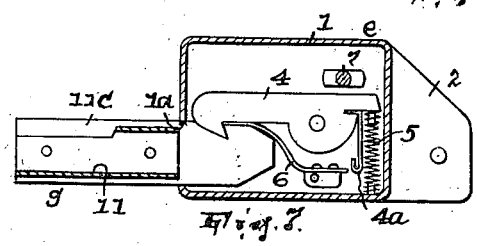
Figs. 7 and 8 are longitudinal sectional views of what is shown in Fig. 4, with the interlocking means in coupled and uncoupled state, respectively.

The inner system tends to collapse from the state shown in Fig. 2 to the state in which the two daggers or hooks 11c enter the openings 1a of the terminal members e and stand held against retraction by or interlocked with the pawls 4 of such members, such collapse being the function of the elastic extensible element f. Specifically, in collapsing the members e are drawn toward the linkage so that they receive the daggers projecting from the ends of the linkage and, by the daggers and pawls cooperating to form interlocks, said system ceases to be extensible and becomes non-extensible. Figs. 3, 4 and 7 show a fragment of said system in its thus collapsed and non-extensible state.

To apply the device to the tire it is draped over the same in the manner shown by Fig. 2, with coupling d above the tire and (since the latter contacts the ground) with segment c traversing the tire at its outer side, it being understood that by the buttons or cams 7 the interlockings have been dis-established and that each segment connecting coupling d with an end of segment c is extended, preferably as far as possible, as shown. Thereupon, when the vehicle is moved forward or back (or at least after a few turns of the tire) and segment c is thus freed, under the stress of the springs f said segment will assume its operative position at the inside of the tire and, the system continuing to collapse, it finally becomes locked by the daggers and pawls in non-extensible state, or so that the non-extensible annulus now formed by the interlocked parts c, e, d and the linkages will coact with the outer endless system a positively to support the traction elements b in their tractive effort.

Figure 8:
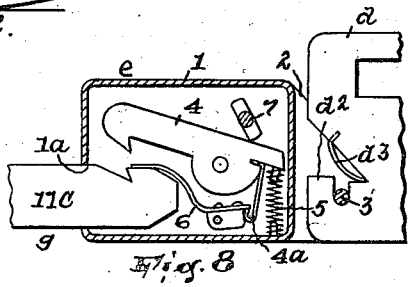
Figures 9, 10:
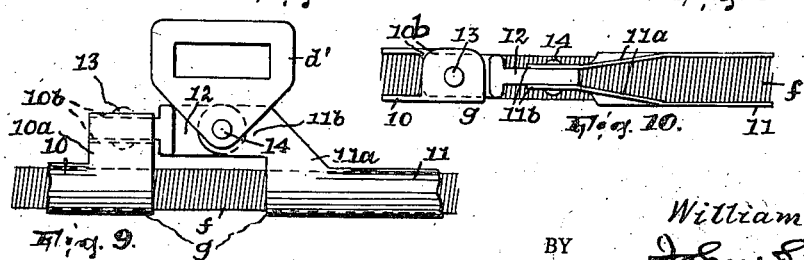
Figs. 9 and 10 are, respectively, a side elevation and a plan of a connection between parts of a linkage $g$, coupling $d'$ and dagger $11c$ being omitted in Fig. 10.

The device is removable by first manipulating the buttons or cams 7 to disestablish the interlocks and thus re-establish the inner system in elastic extensible state, segment c being then adjacent to the ground, whereupon the device may be pulled upon to draw the extensible segment of the inner system over the tire toward its outer side. Or, as shown by Fig. 8, one of the segments connected to coupling d may be disconnectively connected therewith as by providing the latter with a hook portion $d^2$ whose crotch is obstructed by a spring $d^3$ so that pivot 3 cannot enter or leave the crotch except by manual effort.

The stems 9 are present partly to insure the daggers (which lie flat against the tire) entering the openings 1a in the cases 1 when the inner system undergoes collapse and partly to prevent kinking of the springs f when collapse ensues or in handling the device when detached.

In the modification shown by Figs. 11 and 12 the interlocking is afforded as follows: Each terminal member consists of a U-shaped part 13 attached to the end of segment c say, by a pin 13a and having the spring f and the stem 9 attached thereto by a pin 13b. The part 11 of linkage g provides a housing 14 in which are pivoted two pawls 15 spring-urged together and adapted to be cammed apart by and thereupon to interlock with part 13 under the urge of the springs. In unlocking the inner system in this case the pawls 15 are manually pressed upon to disengage them from part 13.

The normal state of the annulus formed by the parts c—e—g—d—g—e is collapsed and locked against extension. It is disruptible in this example at a number of points but it may be disruptible at only a single point if, in its non-extensible state, it approximates in circumference the maximum circumference of the tire. In this view of the assembly to form the inner endless system of my anti-skid device, therefore, the same may be said to include a flexible non-extensible length (as c—e—g—d—g—e) adapted to have its terminals (say, for instance, formed by e and g at the lower right) arranged to project in opposite directions and be thereupon each moved, in the direction in which it projects, in wiping contact with the other terminal, said terminals respectively having coactive means (as here 4 and 11c or 15—13) to interlock them, when they are so moved, against movement in the opposite directions, whereby to form of said length an annulus, and an elastic extensible length f penetrating said terminals and connecting points of the first-named length both sides of said means. One advantage of such an assembly is that the traction elements may obtain support on the non-extensible length immediately, rather than on the elastic extensible length.

In the appended claims what I term a "latch"

and a "keeper" are afforded by the pawl 4 and the dagger 11c, respectively, or by either pawl 15 and the U-shaped part 13, respectively, in Figs. 11 and 12.

Each linkage g is confined to the corresponding elastic length f against displacement but is shiftable lengthwise thereof. Consider either linkage, as the one at the right in Fig. 2, as not yet coupled with the train of parts 3—c—3—e—g—e—3—d—3 (reading clockwise), treated as all intercoupled. We then have, structurally, an assembly forming the inner system which includes a flexible non-extensible section (consisting of said train), a flexible elastic extensible length (as the one, f, adjacent the mentioned linkage) connecting the terminals 3—3 of said non-extensible section, a non-extensible section (said linkage g, here flexible) between said terminals 3—3 and shiftable lengthwise of the extensible section f, and means (as e—e) to intercouple said terminals with the second-named section to form of the two sections an endless system.

Having thus fully described my invention, what I claim is:

1. In an anti-skid device of the class set forth, an assembly to form the inner endless system of such device and afford support for the traction elements thereof including a flexible non-extensible length adapted to have its terminals arranged to project in opposite direction and be thereupon each moved, in the direction in which it projects, in wiping contact with the other terminal, said terminals respectively having means coactive to interlock them, when they are so moved, against movement in the opposite directions, and an elastic extensible length penetrating said terminals and connecting points of the first-named length both sides of said means.

2. The combination set forth in claim 1 characterized by said non-extensible length affording the immediate support for said traction elements.

3. In an anti-skid device of the class set forth, an assembly to form the inner endless system of such device including a flexible non-extensible section having terminals, a flexible elastic extensible length connecting said terminals, a non-extensible section between said terminals and shiftable lengthwise of and confined to said extensible length against lateral displacement, and means to intercouple said terminals with the second-named section to form of the two sections an endless annulus, both such sections forming support for the traction elements of said device.

4. The assembly set forth in claim 3 characterized by the second-named section being flexible.

5. The assembly set forth in claim 3 characterized by the second-named section being universally flexible.

6. In an anti-skid device of the class set forth, an assembly to form the inner endless system of such device comprising a flexible normally endless annulus including as different segments thereof a plurality of portions and means to releasably connect the adjoining ends of each two adjoining portions together, in combination with an elastic extensible length extending lengthwise of one such portion and confined at intervals of both itself and such portion to the latter against lateral displacement therefrom and extending at both its ends beyond the connecting means and connected to the other such portion.

WILLIAM A. POOL.